United States Patent [19]

Neuhard et al.

[11] Patent Number: 5,146,546
[45] Date of Patent: Sep. 8, 1992

[54] PRINTER WITH HARDWARE SYMBOL DATA ACCESSING SCHEME

[75] Inventors: Lance D. Neuhard, New Carlisle; John S. Cetnar, Brookville, both of Ohio

[73] Assignee: Monarch Marking Systems, Inc., Miamaisburg, Ohio

[21] Appl. No.: 692,548

[22] Filed: Apr. 29, 1991

[51] Int. Cl.$^5$ ............................................. G06K 15/00
[52] U.S. Cl. ..................................... 395/115; 395/110
[58] Field of Search ............... 395/101, 110, 166, 114, 395/117, 115, 150, 165; 340/735, 748, 750; 358/470

[56] References Cited

U.S. PATENT DOCUMENTS 4,881,180 11/1989 Nishiyama ........................... 395/110

Primary Examiner—Arthur G. Evans
Attorney, Agent, or Firm—McAndrews, Held & Malloy, Ltd.

[57] ABSTRACT

A printer is shown for printing a large number of symbols from a standardized set of symbols wherein each symbol has an associated code word that identifies the symbol within the set. The pixel data for each symbol in the standardized set is stored in a memory at addresses that are different from the code word identifying the symbol. The printer includes a microprocessor control circuit that receives input data including a code word identifying a symbol to be printed from an input device. The microprocessor control circuit includes a direct memory access controller for controlling the transfer of data from the symbol memory to an output image buffer. Hardware is provided to generate the addresses to the symbol memory necessary to read pixel data for a given symbol out from the memory in response to an output code word thereby eliminating the need for a large look-up table.

27 Claims, 7 Drawing Sheets

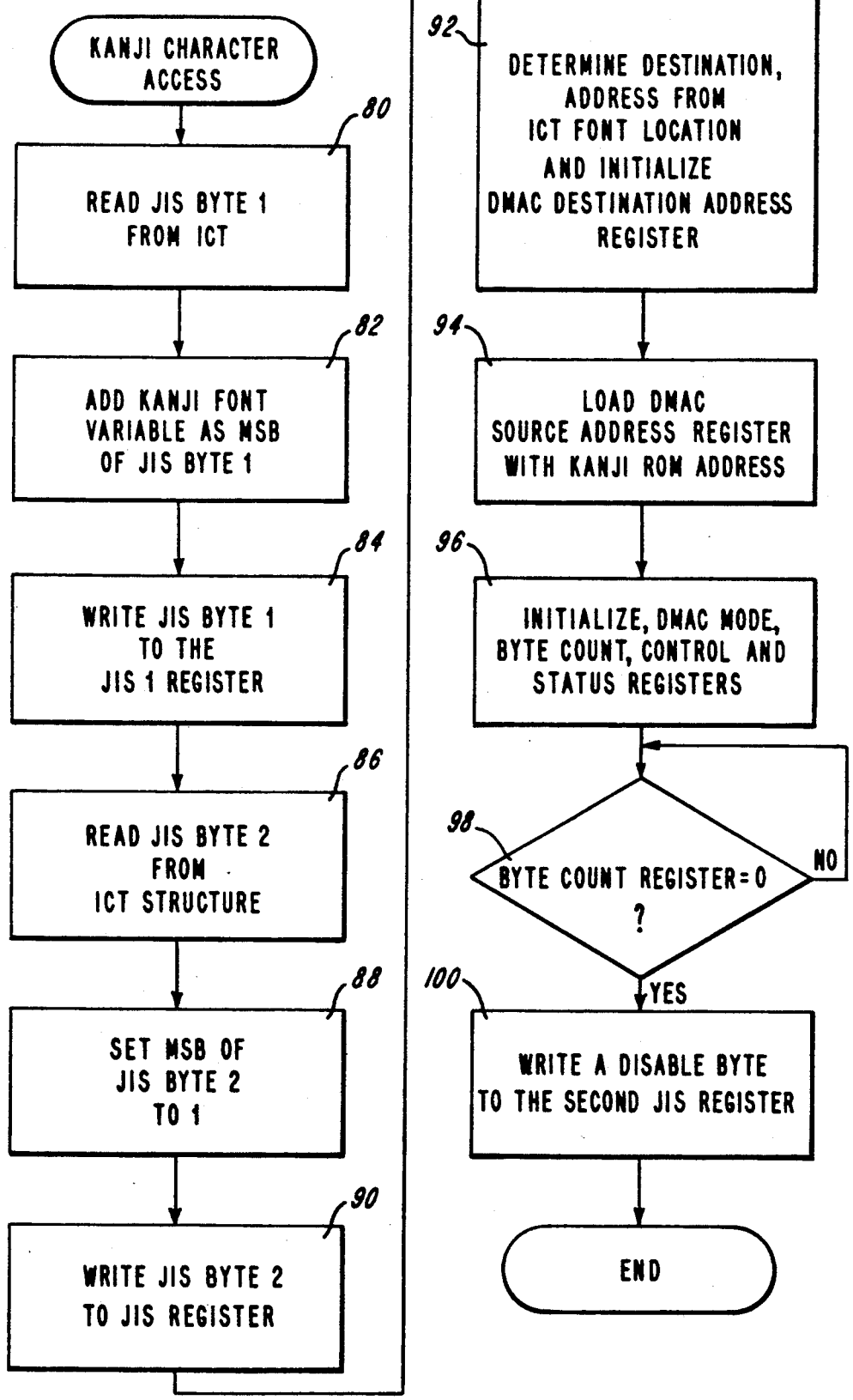

PRINTER WITH HARDWARE SYMBOL DATA ACCESSING SCHEME

TECHNICAL FIELD

The present invention relates to a printer for printing a large number of symbols such as Kanji characters from a standardized set of symbols wherein each symbol has an associated code word that identifies the symbol within the set, the code word being used as an input to the printer to select a symbol to be printed. More particularly, the present invention is directed to such a printer that includes a memory for storing pixel data for each symbol in the standardized set at addresses that are different from the coded word input to the printer to select a symbol to be printed, the printer utilizing hardware for accessing the pixel data from the printer memory at high speeds without the need for a look-up table.

BACKGROUND OF THE INVENTION

Microprocessor controlled printers are known for printing symbols wherein the pixel data defining each symbol is stored in a memory at addressable locations. Where the data input to the printer for selecting a symbol to be printed is different from the addresses at which the symbol is stored in the printer's memory, a look-up table is conventionally used. The look-up table converts the input data to the actual addresses used to access the data from the printer's symbol memory. When the symbol memory stores vast amounts of data, however, the look-up table needed to address the symbol pixel data can become prohibitively large.

For example, a standardized set of Japanese symbols, Kanji characters, has been developed. This standardized set utilizes an array of 94 rows×94 columns in which the symbols of the set are arranged. Each symbol in the set is identified by a pair of coded words representing the row and column at which the symbol is stored in the 94×94 array. The coded words are referred to as JIS (Japanese Industrial Specification) words and are used as standardized input data to various devices for identifying Kanji characters in the standardized set. Memory devices storing pixel data defining each symbol in the standardized set of Kanji characters have been developed. These memory devices store in excess of 1,000,000 eight bit bytes of information. Further, the addresses for accessing the pixel data for a given Kanji character stored in the memory devices are different from the JIS code words identifying the symbol. The look-up table necessary to convert the JIS words to addresses for accessing all of the pixel data in the Kanji character memory devices would be extremely large preventing the use of a microprocessor with limited memory space.

SUMMARY OF THE INVENTION

In accordance with the present invention, the disadvantages of prior printers for printing symbols from a standardized symbol set requiring vast amounts of symbol data, as discussed above, have been overcome. The printer in accordance with the present invention includes hardware for accessing the pixel data from the printer's symbol memory at high speeds without the need for a look-up table.

More particularly, the printer of the present invention prints selected symbols from a standardized set of symbols, each symbol in the set having associated coded information identifying the symbol within the set. The coded information is provided by a peripheral symbol selection device such as a host computer, keyboard or the like that is operated by a user to select a symbol to be printed.

The printer of the present invention includes a microprocessor control circuit for receiving coded information from the symbol selection device. The microprocessor control circuit, in response to the receipt of coded information generates a source address, a destination address, a code word register address, and a read control signal in order to access pixel data defining the symbol identified by the coded information, the pixel data being stored in a symbol memory. The symbol memory stores pixel data defining each symbol in the standardized set, the symbol memory having symbol addresses associated with each symbol for accessing the pixel data defining the symbol. The printer of the present invention further includes an address decoder that is responsive to a source address for generating a symbol memory enable, the address decoder being responsive to a code word register address for generating a code word register enable. Register means are responsive to the code word register enable for storing coded information coupled thereto from the microprocessor control circuit. Hardware means is responsive to the coded information stored in the register means, the symbol memory enable and to a read control signal for generating the symbol addresses for the selected symbol to cause the pixel data defining the selected symbol to be read from the symbol memory to an image buffer. A print head is responsive to data stored in the image buffer for printing an image of the symbols defined by the stored data.

The hardware means of the present invention includes reconfiguration circuitry that is responsive to the coded information stored in the register means to reconfigure the coded information into a symbol address or starting address for the symbol's pixel data in the symbol memory. A scan position sequencer is further responsive to the enable signals from the address decoder to sequentially generate the addresses other than the symbol starting address necessary to access the pixel data for a selected symbol from the symbol memory.

In accordance with the present invention, the printer includes device select logic to accommodate a symbol memory that includes a plurality of font memories. More particularly, the device select logic enables one of the plurality of font memories to be responsive to the addresses generated by the reconfiguration circuitry and the scan position sequencer. Further, each of the font memories may include a plurality of memory devices where, for example, each memory device within a particular font may store a portion of each symbol stored in the font. To accommodate a font memory formed of a plurality of memory devices, the printer of the present invention further includes a device select sequencer for controlling the device select logic to sequentially enable each of the memory devices of the font memory. The device select sequencer also controls the time at which the scan position sequencer sequentially generates the addresses for the accessing of the pixel data in the plurality of memory devices.

The hardware symbol data accessing scheme of the printer of the present invention utilizes a very small number of microprocessor memory locations in order to access vasts amounts of symbol data stored in the printers symbol memory. The hardware scheme of the present invention provides high-speed data transfer between the symbol memory and the image buffer. Further, the hardware scheme of the present invention allows slow memory devices to be utilized without impeding the high-speed nature of the data transfer between the symbol memory and the image buffer.

These and other objects, advantages, and novel features of the present invention, as well as details of an illustrated embodiment thereof, will be more fully understood from the following description and the drawing.

BRIEF DESCRIPTION OF THE DRAWINGS

FIGS. 2A-2B are flow charts illustrating the operation of the printer's microprocessor in the data accessing scheme of the present invention;

DESCRIPTION OF THE PREFERRED EMBODIMENT

Figure 1:
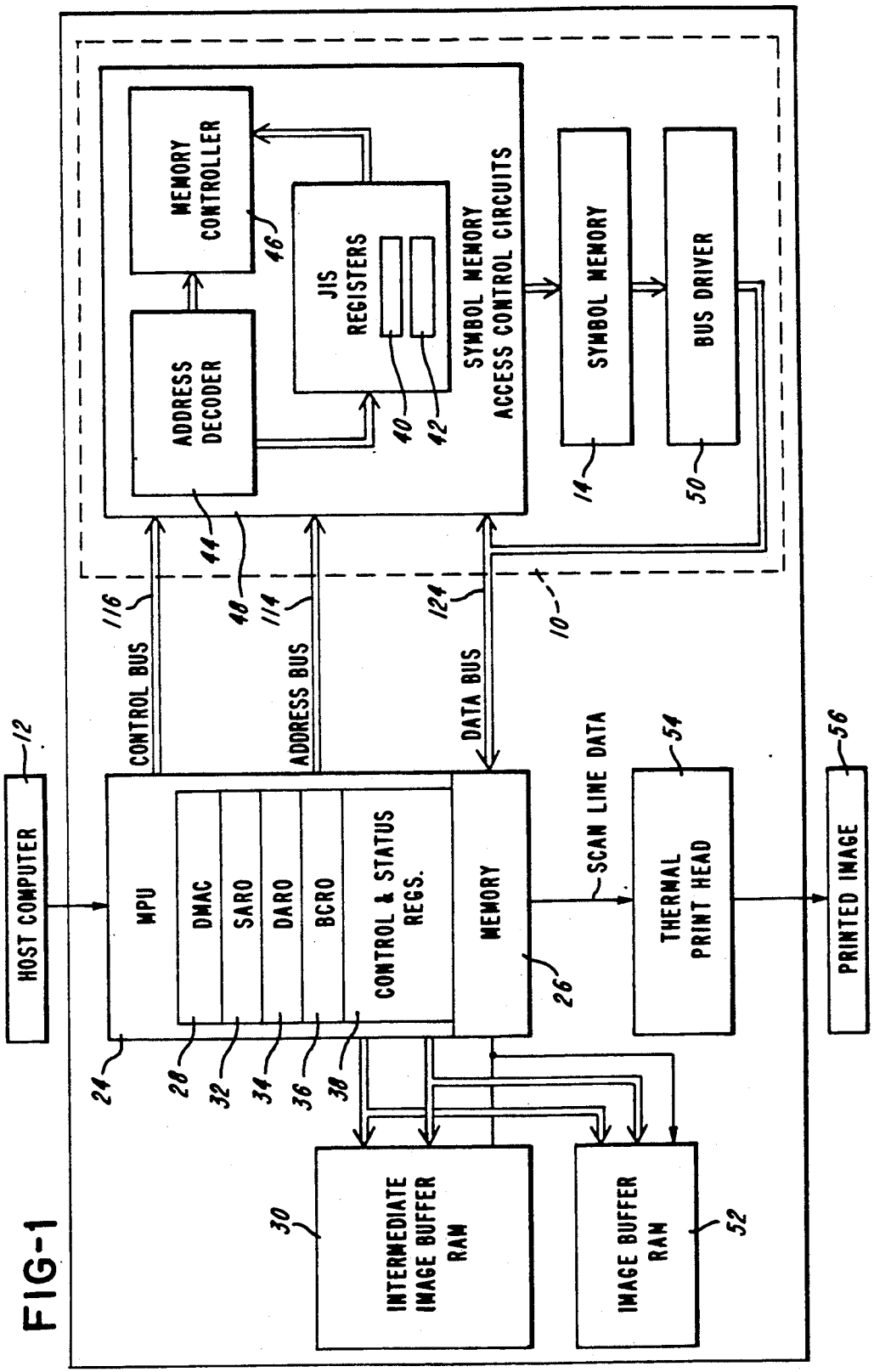
FIG. 1 is a blocked diagram of the printer of the present invention.

Printer 10, in accordance with the present invention is responsive to input data from a host computer 12 to print selected symbols, defined by pixel data stored in a symbol memory 14. The memory 14 stores a vast amount of pixel data defining symbols such as Kanji characters. More particularly, the memory 14 stores pixel data for each of the Japanese symbols found in the Japanese industrial specification 6226-1978. The Japanese industrial specification 6226-1978 provides a standardized symbol set for the Japanese Kanji characters. The symbols, i.e., Kanji characters in the standardized set are arranged in a large array of 94 rows × 94 columns, wherein each symbol in the set is identified by a pair of coded words referred to as JIS words. The JIS words for each symbol consists of two seven bit binary words respectively representing the row and the column locations of the symbol in the 94 × 94 array. The JIS words are thus standardized coded words that are used by any number of various devices to identify a symbol within the set of symbols defined by the Japanese industrial specification 6226-1978.

The symbol memory 14 includes a 16 × 16 font memory and a 24 × 24 font memory for storing the pixel data for the Kanji characters. More particularly, as shown in detail in FIG. 3B, the symbol memory 14 includes a single memory device 16 forming the 16 × 16 font memory wherein each symbol stored in this font memory is defined by 16 × 16 pixels. The memory device 16 utilizes 32 sequential addresses for accessing, in eight bit portions, the 16 × 16 pixel data defining a symbol in the 16 × 16 font memory. As discussed in detail below, the 24 × 24 font memory includes three memory devices 18, 20, and 22 each of which stores a portion of each symbol stored in the 24 × 24 font memory. The 24 × 24 font memory utilizes 24 sequential addresses to access the data stored therein for one symbol wherein each device 18, 20, and 22 contains ⅓ of the 24 bit wide symbol pixel data. More particularly, for each of the 24 sequential addresses per symbol, each of the three devices 18, 20, and 22 is sequentially enabled to respond to a given address before the address is incremented to the next address in the sequence. The addresses used to access the pixel data for each symbol stored in the memory devices 16, 18, 20, and 22 of the symbol memory 14 are related to but different than the JIS words identifying the symbol.

In order to print a field of Kanji characters defined by pixel data stored in the memory 14, the host computer 12 provides input data to the printer 10 including the JIS words identifying each Kanji character in the field to be printed. The input data from the host computer 12 to the printer 10 also includes a font parameter that determines whether the 16 × 16 or 24 × 24 font memory is to be used; and a parameter identifying the number of Kanji characters in the field to be printed. The input data received by the printer 10 from the host computer 12 is stored by the printers microprocessor 24 in the microprocessor's working memory 26 for use as described below. It is noted that the host computer 12 may also transmit to the printer 10 data defining magnification factors, rotation factors, etc. for the Kanji field to be printed, the host microprocessor 24 of the printer 10 utilizing such input data to print the Kanji field in a particular manner as is well known in the art. It is further noted that although a host computer is shown for providing the input data to the printer 10, other input devices including a keyboard or the like may be used to supply the input data to the printer 10.

The microprocessor 24 operates in accordance with software stored in an EPROM forming a portion of the memory 26. A ROM forming another portion of the memory 26 stores the input data in an image control table that provides a data structure usable by the printer's software. The microprocessor 24 also includes a direct memory access controller, DMAC, 28 to support high speed data transfers between the symbol memory 14 and an intermediate image buffer 30. The DMAC may be a Hitachi HD64180 DMAC, for example, that contains two channels, channel zero being used to transfer data from the symbol memory 14 to the memory 30. The DMAC 28 includes a source address register 32, a destination address register 34 and a byte count register 36 as well as various control and status registers 38, discussed in detail below. The DMAC controller 28 operates in a cycle steal mode such that the microprocessor 24 is given a cycle for each byte of data transferred by the DMAC 28 until the transfer of all the bytes of data defining a symbol are complete.

The access of a Kanji character from the 10 symbol memory 14 begins with the microprocessor 24 transferring the JIS words for a given symbol from the memory 26 to a respective pair of JIS registers 40 and 42 wherein the JIS words transferred to the registers 40 and 42 are modified to include font information and a chip enable as discussed below. After being initialized, the DMAC 28 transfers the starting address of the symbol memory 14 to the address decoder 44. The address decoder 44 generates clock enable signals for the JIS registers 40 and 42 as well as enable signals for the symbol memory 14 and memory controller 46. The memory controller 46 includes four portions: address redirection logic 140, a device select sequencer 150, a scan position sequencer 170, and device select logic 160, each of which is shown in detail in FIG. 4. The circuits within the memory controller 46 are responsive to the data stored in the JIS registers 40 and 42 to generate the addresses and control signals necessary to access the pixel data for a particular symbol stored in the symbol memory 14. The pixel data accessed from the symbol memory 14 for a given symbol is transferred to the intermediate image buffer RAM 30 via an output bus driver 50.

After the pixel data for each symbol of the character field defined by the data transferred to the printer 10 from the host computer 12 is assembled in the intermediate image buffer RAM 30, the microprocessor 24 transfers the data to an output image buffer RAM 52. Thereafter, the microprocessor 24 controls a thermal print head 54 to print an image of the symbols, defined by the data stored in the image buffer RAM 52, on a web of record members 56 such as paper stock on which labels are carried or the like. More particularly, the thermal print head 54 may include a series of print elements such as resistors or the like as is well known in the art. When each print element is energized in accordance with the pixel data stored in the image buffer RAM 52, the print element generates heat to cause a dot to be printed on heat sensitive stock 56. Where the print head includes a single row of print elements, the microprocessor 24 couples to the print head one row of pixel data at a time. The microprocessor controls a stepper motor or the like, not shown, to move the stock 56 with respect to the print elements. An image of the symbols stored in the image buffer ROM 52 is thereby printed on the stock 56. It is noted that those circuits which are standard in the art such as a thermal print head are not shown in detail. Further, although the print head 54 is shown as being thermal, other print heads such as those utilizing light, etc. may also be used with the printer of the present invention.

Figure 2A:
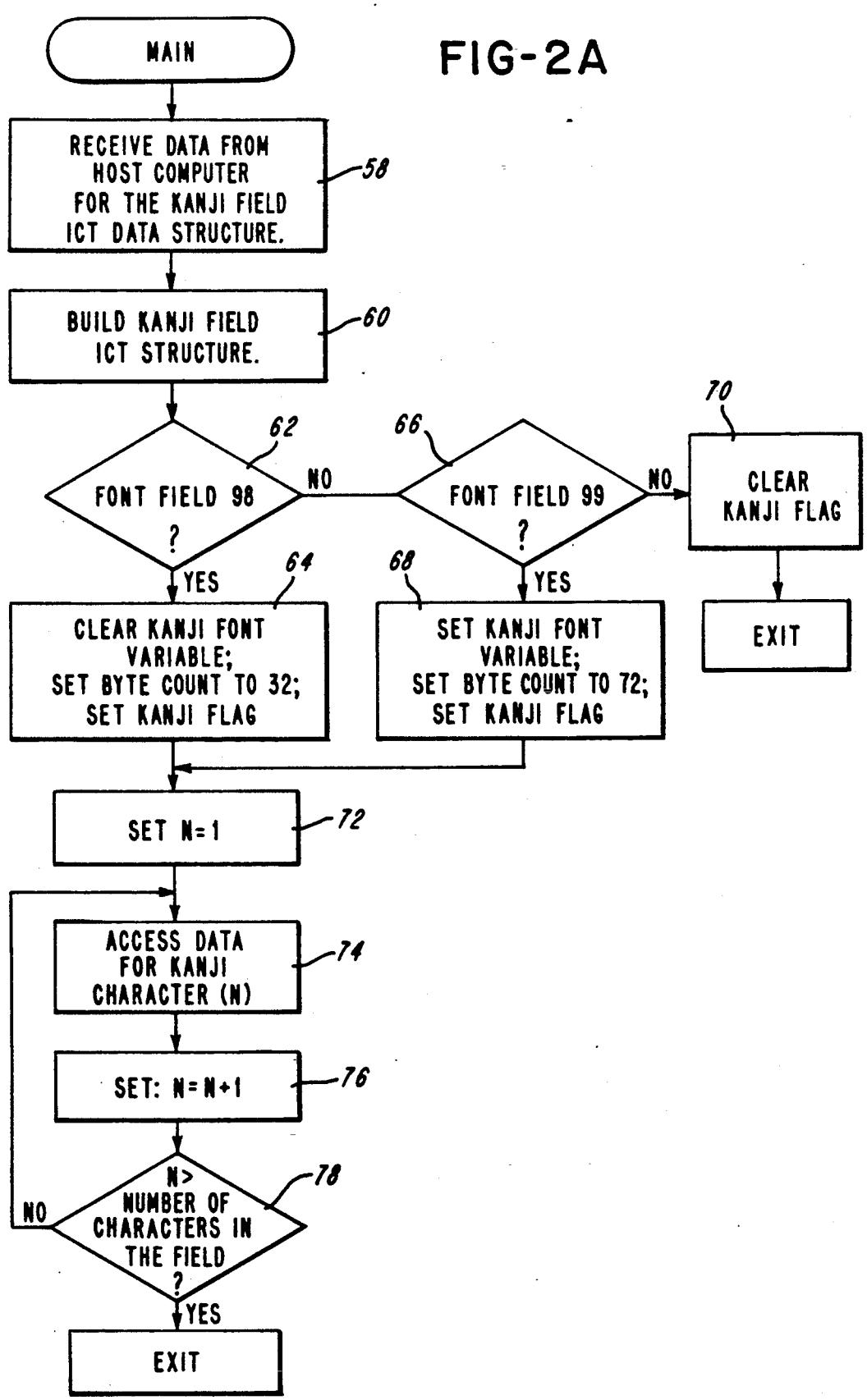

In order to access the data from the symbol memory 14 for the character field defined by the data received from the host computer 12, the microprocessor 24 operates in accordance with the software depicted in FIGS. 2A and 2B. The microprocessor 24 at a block 58 receives the input data from the host computer 12 as discussed above. Thereafter, the microprocessor 24 uses the input data to build a Kanji field image control table, ICT, which is a data structure useable by the microprocessors software. The microprocessor 24 stores the ICT data structure in the RAM portion of the memory 26 at a block 60. The microprocessor at a block 62 determines whether the font parameter in the ICT data structure is set equal to 98, signifying that the font to be utilized for the Kanji field is the 16×16 Kanji font. If the 16×16 Kanji font is indicated by the font parameter of the ICT structure, the microprocessor at block 64 clears the Kanji font variable; sets a variable representing the byte count to 32, there being 32 bytes of data being read from the symbol memory 14 for a 16×16 font symbol; and further sets a Kanji flag. If the microprocessor 24 determines that the 16×16 font is not selected as determined by the microprocessor 24 at block 62; but the microprocessor 24 determines at a block 66 that the 24×24 font is selected, the font field parameter being set equal to 99, the microprocessor proceeds to block 68. At block 68, the microprocessor sets the Kanji font variable; sets the byte count variable to 72, 72 bytes of data being read from the symbol memory 14 for the 24×24 Kanji font; and sets the Kanji flag. If the microprocessor 24 determines that neither the 16×16 Kanji font or the 24×24 Kanji font is selected, the microprocessor at a block 70 clears the Kanji flag and exits to determine whether data other than the data stored in the symbol memory 14 is to be printed.

From blocks 64 or 68, the microprocessor 24 proceeds to block 72 to set a pointer, N equal to 1. Thereafter at block 74, the microprocessor 24 accesses the data for the Nth Kanji character from the symbol memory 14 in accordance with the software depicted in FIG. 2B. After the data for the Nth Kanji character is transferred from the symbol memory 14 to the intermediate image buffer RAM 30, the microprocessor 24 increments the pointer N at a block 76. At block 78, the microprocessor determines whether the data for each symbol in the Kanji field has been transferred from the symbol memory 14 to the intermediate image buffer RAM 30 by comparing N to the input data parameter identifying the number of Kanji characters in the field. If the transfer of data for the character field has not been complete, the microprocessor 24 returns to block 74 to access the data for the next Kanji character. Otherwise, the microprocessor 24 exits the main Kanji character data accessing routine depicted in FIG. 2A to control the transfer of the data from the image buffer RAM 30 to the output image buffer RAM 52 and to control the transfer of data from the RAM 52 to the thermal print head 54 for printing an image of the character field on the record 56.

In order to access the data for the Nth Kanji character, the microprocessor 24 at block 74 implements the software routine depicted in FIG. 2B. More particularly, at block 80 the microprocessor 24 reads the first JIS byte from the ICT data structure in the memory 26. Thereafter, at block 82 the microprocessor 24 adds the Kanji font variable as the most significant bit of the first JIS byte. More particularly, the first JIS byte is 7 bits. At block 82 the microprocessor adds a bit in the most significant bit position to form an 8-bit JIS byte word. The added most significant bit of the first JIS byte word is set equal to zero if the font variable from the ICT structure indicates that the 16×16 font is selected. Alternatively, the most significant bit of the modified 8-bit JIS word is set to 1 if the 24×24 font is selected. At block 84 the microprocessor 24 writes the modified 8-bit JIS word to the first JIS register 40. The microprocessor 24 then reads at block 86 the second JIS byte word from the ICT structure. At block 88 the microprocessor modifies the 7-bit, second JIS word to an 8-bit word wherein the most significant bit of the modified word is set equal to one. When inverted, the most significant bit of the modified second JIS word forms a chip enable as discussed in detail below. The microprocessor 24 writes the modified, second JIS word to the second JIS register 42 at block 90.

After the first and second JIS registers are loaded with the respective modified first and second JIS words, the microprocessor at block 92 determines the destination address from the font location parameter stored in the ICT data structure of the memory 26. At block 92, the microprocessor further initializes the destination address register 34 of the DMAC 28 with the destination address determined from the ICT font location parameter, the destination address being set equal to the address of the intermediate image buffer RAM 30. The microprocessor 24 at block 94 loads the source address register 32 with the starting address of the symbol memory 14. Thereafter, the microprocessor 24 at block 96 initializes the mode, byte count, control and status registers of the DMAC 28. More particularly, the mode of the DMAC 28 is set to the cycle steal mode of operation. The mode register will further be set for the destination to be a memory and to increment the destination address register after the transfer of each byte of data from the symbol memory 14 to the ROM 30. Further, the mode register will also be set for the source to be memory and to increment the source address register 32 after the transfer of each byte of data. It is noted that depending on the particular DMAC used, the source address may also be a fixed address representing a single address of the symbol memory 14. A DMAC wait register, not shown, will be set to the zero memory wait state and a DMA status register will be set to disable the DMAC interrupt and enable the DMAC channel zero. The byte count register 36 of the DMAC 28 is set equal to the byte count variable. Thereafter, the microprocessor 24 allows the DMAC 28 to transfer each byte of data from the symbol memory 14 in a cycle steal mode until the byte count register is decremented to zero by the DMAC. Since the byte count register 36 is set equal to the byte count variable determined at block 64 and 68 respectively, the byte count register will be zero after 32 bytes have been transferred from the 16×16 font memory or after 72 bytes of data have been transferred from the 24×24 font memory. When the byte count equals zero, the microprocessor, at block 100 writes a symbol memory disable byte to the second JIS register 42 to reduce power consumption by the symbol memory. Thereafter, the microprocessor returns to block 76 of the routine shown in FIG. 2A to access the pixel data stored in the symbol memory 14 for the next symbol or character in the field.

Figure 3A:
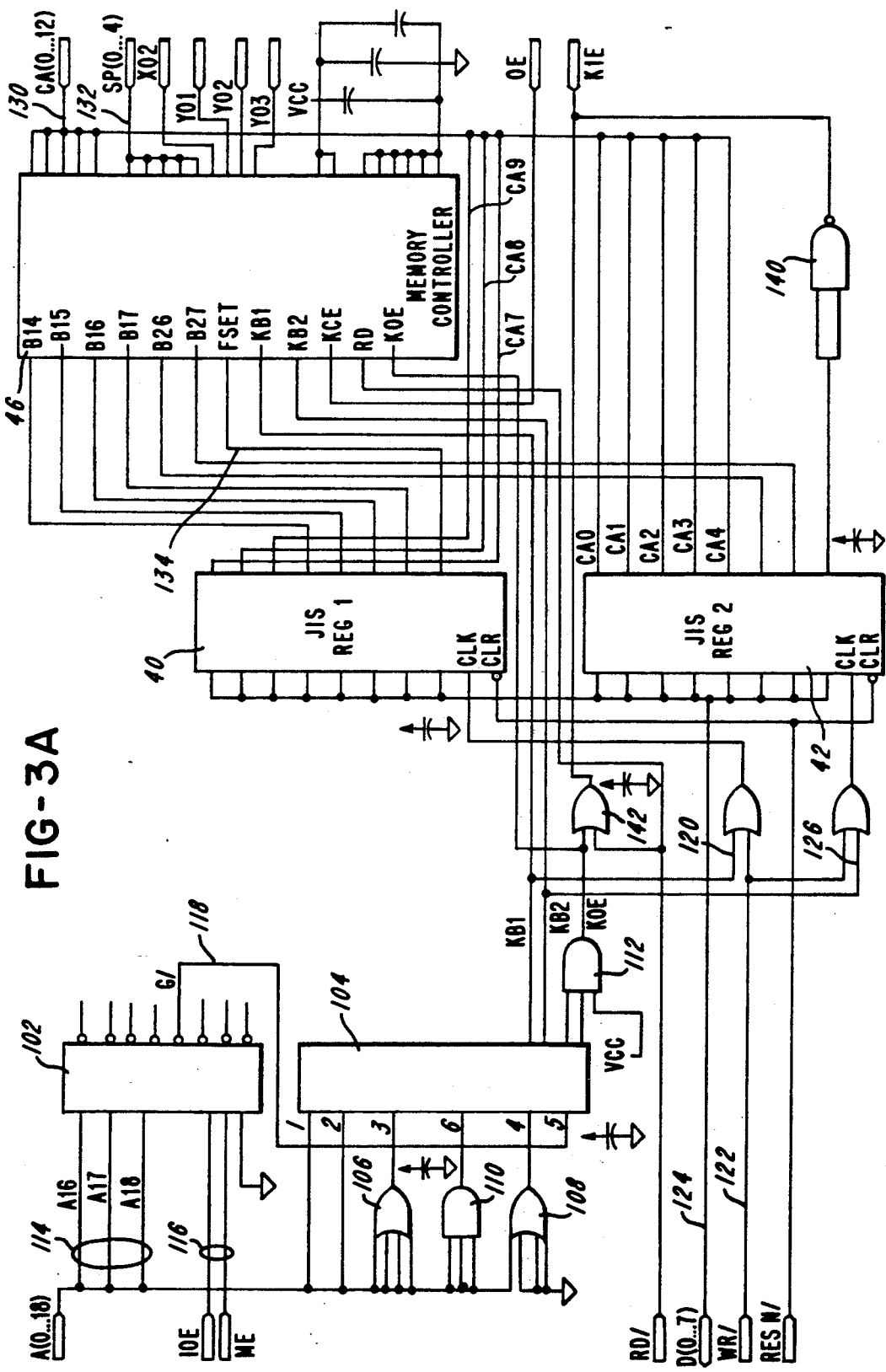
FIGS. 3A and 3B form a schematic diagram of the symbol memory access control circuits shown in FIG. 1.
Figure 3B:
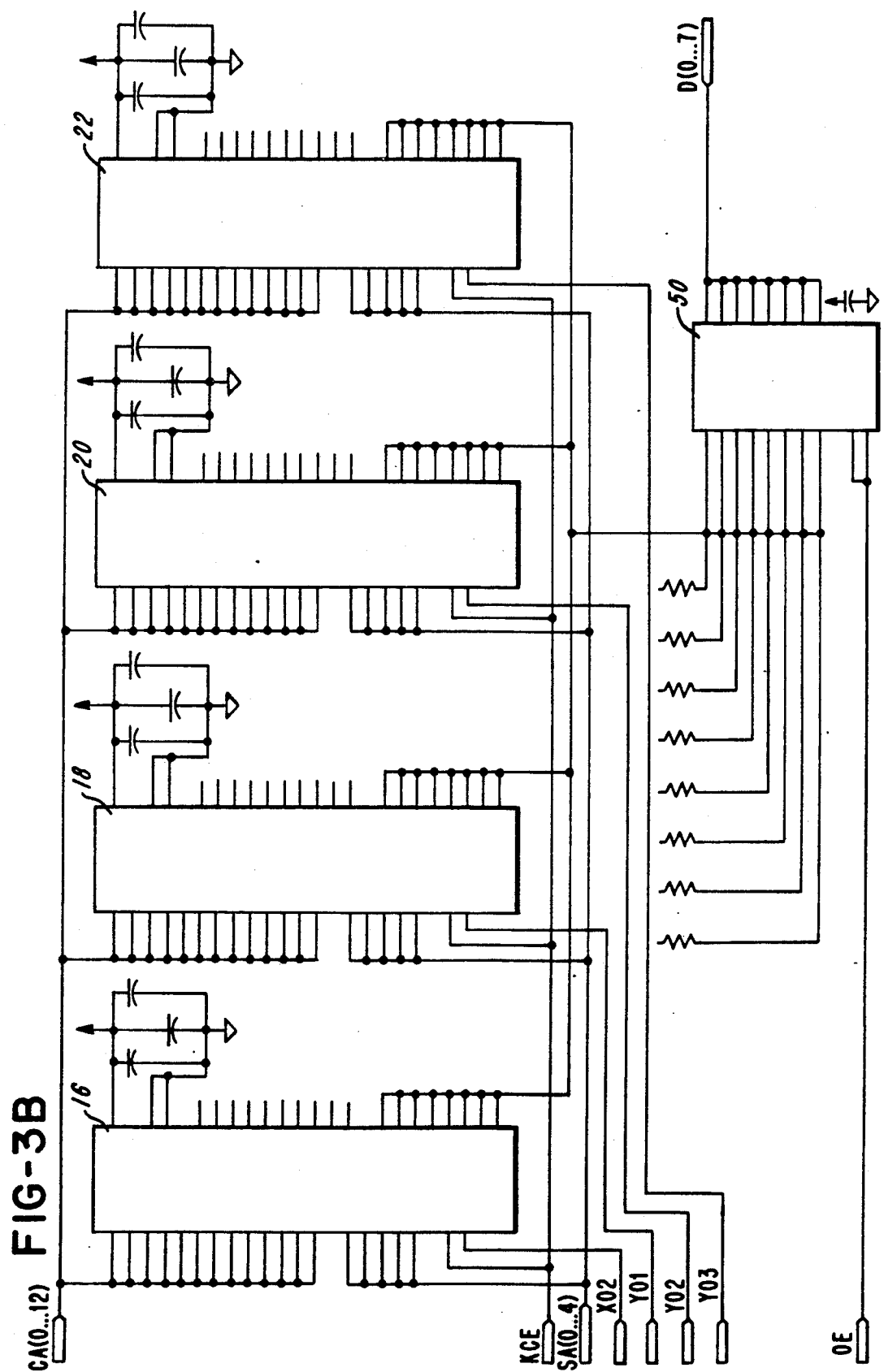

FIGS. 3A and 3B illustrate the symbol memory access control circuits 48 shown in FIG. 1. The address decoder 44 includes a 3:8 memory decoder 102, a 3:8 Kanji ROM address decoder 104 a pair of NOR gates 106 and 108 and a pair of AND gates 110 and 112. The 3:8 memory decoder 102 is responsive to the 16th, 17th, and 18th bits on the address bus 114 and a low going memory enable signal, ME on the control bus 116 to provide a signal on line 118 to enable the Kanji address decoder 104 when the address on bus 114 is the address in the source address register 32, i.e., an address associated with the symbol memory 14. The memory decoder 102 is responsive to the 16th, 17th, and 18th address bits of other addresses to enable other memory devices, not shown, as well. The Kanji address decoder 104 enables Kanji character access by decoding the upper address byte on the address bus 114 to generate the appropriate clock enables, KB1 and KB2 for the respective JIS registers 40 and 42. The Kanji address decoder also generates an output enable signal, KOE for the symbol memory 14. Whenever the first JIS register 40 is addressed by the microprocessor 24, KB1 on line 120 goes low allowing a write signal on line 122 to clock the first JIS word on the data bus 124 into the JIS register 40 on the rising edge of the write signal. Similarly, whenever the second JIS register 42 is addressed, KB2 goes low on line 126, allowing the write signal on line 122 to clock the second JIS word on the data bus 124 into the second JIS register 42 on the rising edge of the write signal.

Figure 4A:
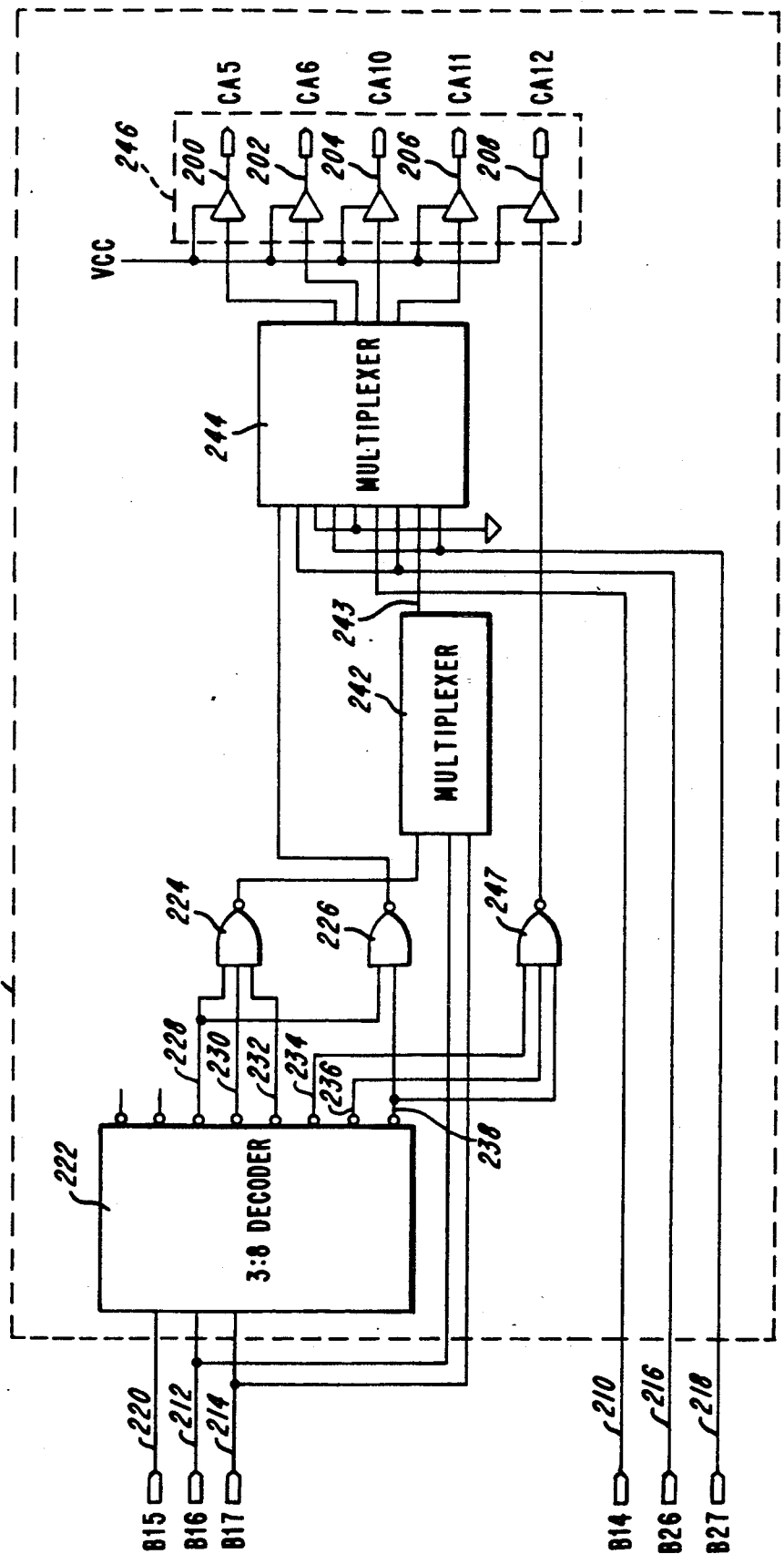
FIGS. 4A and 4B form a detailed schematic of the memory controller shown in FIG. 3A.
Figure 4B:
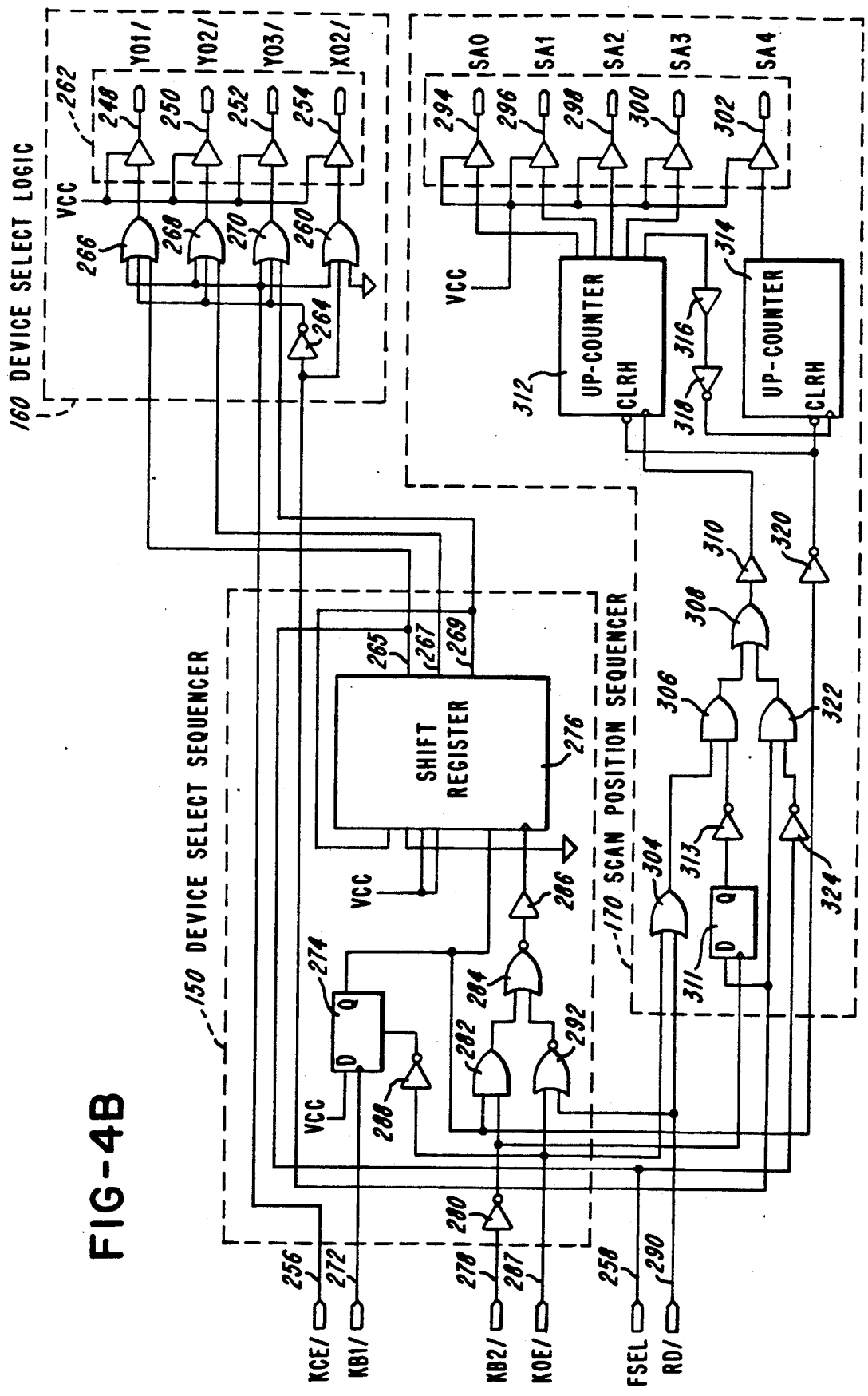

As discussed above, the memory controller 46 includes address redirection logic 140, a scan position sequencer 170, a device select sequencer 150 and device select logic 160 each of which is shown in detail in FIG. 4. The address redirection logic 140 of the memory controller 46 derives the character address applied to the symbol memory 14 on lines 130 by redirecting certain JIS word bits. The redirection of JIS word bits is controlled by bits 5, 6 and 7 of the JIS word byte one stored in the register 40, these bits being designated as B15, B16, and B17 respectively. The 5th, 6th, and 7th bits of the JIS word byte one, i.e., B15, B16 and B17 are not only data bits but control bits as will be apparent from the detailed description of the address redirection logic with respect to FIG. 4. The most significant character address CA12 describes the level of Kanji access. There are two levels of access. The first level is accessed when CA12 is equal to zero, the second level being accessed when CA12 is equal to 1. The character address holds the position in the symbol memory 14 of one symbol, i.e., one Kanji character, so as to select the symbol whose data is read out of the memory 14 for printing. The character address can be thought of as the starting address for a given symbol or character. The character address remains fixed for the entire time that the data for a symbol is being accessed. This time is equal to the amount of time necessary to read 32 bytes for a 16×16 font memory or the amount of time necessary to read 72 bytes for a 24×24 font memory. It is noted that several of the JIS word bits require no redirection and are directly used as character address bits. For example, the first bit of the second JIS word stored in register 42 forms character address bit CA0. The second bit of the second JIS word stored in register 42 forms character address bit CA1, similarly the third, fourth, and fifth bits of the second JIS word stored in the register 42 form character address bits CA2, CA3, and CA4 respectively. Further, the first, second, and third bits of the first JIS word stored in the register 40 form the character address bits CA7, CA8, and CA9 respectively. The character address bits, CA5, CA6, CA10, and CA11 are determined by the sixth and seventh bits of the second JIS word stored in the register 42 as well as the fourth, fifth, sixth, and seventh bits of the first JIS word stored in the register 40 as discussed below.

The scan address bits SA0-4 output on lines 132 are generated by the scan position sequencer 150 of the memory controller 46. The scan address represents the position of one byte forming a Kanji character in the symbol memory 14. The scan address controls the sequence of bytes read from the symbol memory 14 and is incremented until all of the bytes forming the character have been read from the symbol memory 14. More particularly, when the 16×16 font memory is selected, as determined by the most significant bit stored in the JIS register 40 and output on a line 134, the scan position sequencer 170 increments the scan address after each byte of data is read. However, when the 24×24 font is selected, the scan position sequencer 150 increments the scan address only after all three ROMS 18, 20, and 22 have been read from. During the 24×24 font memory accesses, the scan position sequencer 150 is synchronized with the device select sequencer 160 so that the scan address is only incremented once for every three bytes read.

The device select sequencer 150 of the memory controller 46 is essentially a three-bit ring counter that is clocked on a read signal from the DMAC 28 if the JIS registers 40 and 42 are enabled and the symbol memory 14 is enabled. More particularly, upon the completion of each DMAC read, the device select sequencer increments, disabling the present ROM 18, 20, 22 and enabling the next ROM 18, 20, 22 in the sequence so as to determine which of the three ROMS of the 24×24 font memory is accessed in response to a given DMAC read.

The device select logic 160 of the memory controller 46 is responsive to the outputs of the device select sequencer and to the font select signal on line 134 to generate the output enables for each of the ROMS in the symbol memory 14. More particularly, the device select logic generates the output enable X02 for the 16×16 font memory ROM 16 in response to a font select signal set equal to zero. Further, the device select logic generates the respective output enables Y01, Y02, and Y03 for the 24×24 font ROMS 18, 20, and 22 in response to a font select signal set equal to one.

It is further noted that the clock enable signal KCE for the Kanji ROMS 16, 18, 20, and 22 is generated from the most significant bit of the modified JIS word stored in the JIS register 42 wherein that bit is inverted by a NAND gate 140. The output enable OE for the output bus driver 50 is generated by an OR gate 142 the inputs of which are the KOE/ output from the NAND gate 112 and the RD/ from the DMAC 28.

FIG. 4 illustrates the details of the memory controller 46. The address redirection logic 140 derives the 5th, 6th, 10th, 11th, and 12th character address bits, CA5, CA6, CA10, CA11 and CA12, provided on lines 200, 202, 204, 206 and 208 for accessing the symbol memory 14. This derivation is based on the redirection of certain bits from the first and second JIS words stored in the corresponding first and second JIS registers 40 and 42. Specifically, from the first JIS word, redirection involves the 4th, 6th, and 7th bits, designated B14, B16, and B17, which are provided on lines 210, 212, and 214. From the second JIS word, the 6th and 7th bits, B26 and B27, on lines 216 and 218 are also redirected by the address redirection logic 140.

The manner in which the redirection is carried out is governed solely by the 5th, 6th and 7th bits of the first JIS word, B15, B16 and B17, on lines 220, 212, and 214, respectively. Responding to these three JIS word bits, a 3:8 decoder 222 and NAND gates 224 and 226 control redirection. Specifically, the 3:8 decoder 222 monitors the JIS word bits B15, B16 and B17 in a binary fashion from the most significant to the least significant bit. In response, the 3:8 decoder 222 places a low logic level upon one of its output lines 228, 230, 232, 234, 236 or 238. All other outputs of the 3:8 decoder 222 are placed at a logic high level. More specifically, in response to B17, B16 and B15 inputs of 010 on lines 214, 212 and 220 respectively, line 228 goes low. In response to B17, B16 and B15 inputs of 011 on lines 214, 212 and 220 respectively, line 230 goes low. In response to B17, B16 and B15 inputs of 100 on lines 214, 212 and 220, respectively, line 232 goes low. In response to B17, B16 and B15 inputs of 101 on lines 214, 212 and 220, respectively, line 234 goes low. In response to B17, B16 and B15 inputs of 110 on lines 214, 212 and 220, respectively, line 236 goes low and in response to B17, B16 and B15 inputs of 111 on lines 214, 212 and 220, respectively, line 238 goes low.

The NAND gates 224 and 226 respond to the output signals from the 3:8 decoder 222 providing the redirection control. When the 7th, 6th and 5th bits of the first JIS word are set to logic levels forming the binary input sequence of 010, 011 or 100, the 3:8 decoder 222 places a low logic level on the corresponding output provided on lines 228, 230 or 232, causing the NAND gate 224 to produce a logic high level output. With any other binary input sequence, the outputs on lines 228, 230 and 232 are all set at a logic high level, causing the NAND gate 224 to provide a logic low level output. A binary input sequence of 010 or 111 corresponding to bits B17, B16 and B15 of the first JIS word causes the output on line 228 or 238 to be set to a logic low level, causing the NAND gate 226 to provide a logic high level output. Any other input sequence causes a logic low level output from the NAND gate 226.

The NAND gate 224 controls a multiplexer 242 in the selection of either the 6th or 7th bit of the first JIS word, B16 or B17, for further redirection. Specifically, when the NAND gate 224 produces a logic low output, the multiplexer 242 selects the 6th bit of the first JIS word, B16, and places the logic level of this bit on its output line 243. When the NAND gate 224 produces a logic high level output, the 7th bit of the first JIS word, B17, is similarly selected and placed on the output line 243.

The NAND gate 226 similarly controls a multiplexer 244 in the selection of one of two four-bit words generated at the input of the multiplexer 244. The first four bit word, from the least significant to the most significant bit, includes the 6th and 7th bits of the second JIS word, B26 and B27, on respective lines 216 and 218; the fourth bit of the first JIS word, B14, on line 210; and a bit defined by the output of the multiplexer 242 on line 243 which, as discussed above, will either be the 6th or the 7th bit of the first JIS word. From the least significant to the most significant bit, the second four-bit word comprises two bits tied to a low logic level or ground and the 6th and 7th bits of the second JIS word, B26 and B27, on respective lines 216 and 218. When the output of the NAND gate 226 is at a high logic level, the multiplexer 244 responds by placing the first four bit word onto its output which, via a driver 246 forms the 5th, 6th, 10th and 11th character address signals, CA5, CA6, CA10 and CA11, on respective lines 200, 202, 204 and 206. When the output of the NAND gate 226 is at a low logic level, the second four-bit word will be similarly selected and provided as the respective character address signals CA5, CA6, CA10 and CA11.

The 12th character address signal, CA12, is provided by a NAND gate 247. Specifically, the NAND gate 247 produces a high level output when the output of the decoder 222 on any of lines 234, 236 or 238 goes low representing B17, B16, B15 words of 101, 110 or 111, respectively. For any other combinations of B17, B16 and B15, a logic low level is produced at the output of the NAND gate 247. Instead of controlling further redirection as provided by the NAND gates 224 and 226, the output of the NAND gate 247 directly provides the 12th character address bit, CA12, on line 208 via the driver 246.

The device select sequencer 150 and device select logic 160, perform the function of generating the appropriate sequence and timing of the output enable signals, Y01/, Y02/, Y03/ and X02/, provided on lines 248, 250, 252 and 254, which are applied to the Kanji ROM's 18, 20, 22 and 16, respectively. Specifically, when the 16×16 font memory 16 is accessed, the device select logic 160 provides the output enable signal, X02/, to the ROM 16 upon receiving both the Kanji ROM enabling signal, KCE/, on line 256, and the font select signal, FSEL, on line 258. As previously detailed, these two signals will be generated as soon as the first and second JIS words are written by the microprocessor 24 into the first and second JIS registers 40 and 42. More specifically, when the 16×16 font is selected so that the font select signal, FSEL, is set to a logic low level and the Kanji ROM enabling signal, KCE/, is set to a logic low level, an OR gate 260 provides a logic low level output causing a driver 262 to generate an enabling output enable signal, X02/, for the 16×16 font memory 16 on line 254. In response to the low level font select signal an inverter 264 produces a logic high level output signal causing the output enable signals, Y01/, Y02/, and Y03/ provided by the driver 262 on respective lines 248, 250 and 252 to go high, via OR gates 266, 268 and 270. In this manner, only the ROM 16 is enabled during the entire 32 byte access of the 16×16 font.

When accessing the 24×24 font memory, the font select signal, FSEL, on line 258, is set to a logic high level, causing the output enable signal, X02/, on line 254 to go high, thereby disabling the ROM 16. The OR gates 266, 268 and 270 are responsive to low level output from the inverter 264 and the low level Kanji ROM enabling signal, KCE/, on line 256 as well as a low level ROM 1, ROM 2 or ROM 3 enable signal on respective lines 265, 267 and 269 from the device select sequencer 150 to produce a corresponding low level enable Y01/, Y02/ or Y03/ for ROM's 18, 20 and 22, respectively.

When the 24×24 font memory access is selected, the device select sequencer 150 basically performs the function of a three bit ring counter which circulates a low going signal sequentially onto the outputs of the OR gates 266, 268 and 270 providing the ROM 1, ROM 2 and ROM 3 enables. More specifically, to access the 24×24 font, the microprocessor 24 places the address of the first JIS register 40 onto the address bus 114. In response, the address decoder 104 generates a logic low KB1/ enable for the first JIS register on line 272, providing a write pathway to the first JIS register 40. After the microprocessor 24 writes to the first JIS register 40, the address on the address bus 114 changes and, in response, the address decoder 104 disables the KB1/ signal by returning it to a logic high level. On the rising edge of KB1/, a flip-flop 274 is clocked providing a high level output which places a shift register 276 into a parallel load mode. Next, the microprocessor places the address of the second JIS register 42 onto the address bus 114. In response, the address decoder 104 produces a low level KB2/ enable signal on line 278 for the second JIS register. This low level on KB2/ provides a write pathway to the second JIS register 42. After the microprocessor 24 performs the write to the second JIS register 42, the address on the address bus 114 again changes. In response, the address decoder 104 disables signal KB2/ on line 248 by returning it to a logic high level. On the rising edge of KB2/, the shift register 276 loads a binary 011 onto its output lines 265, 267 and 269, respectively. More specifically, on the rising edge of KB2/ an inverter 280 produces a falling edge on its output causing an AND gate 282 to produce a falling edge at its output. This falling edge signal causes the production of a rising edge signal at the output of a NOR gate 284 and a buffer 286, clocking or loading the binary 011 onto the outputs 265, 267 and 269 of the shift register 276. In this manner, the shift register 276 initially provides a low level output enable signal, Y01/, on line 248 via the OR gate 266 and the driver 262 to enable ROM 18, while providing logic high level signals Y02/ and Y03/ on lines 250 and 252 via the OR gates 268 and 270 and driver 262 to disable ROM's 20 and 22. When the DMAC 28 begins the transfer of the Kanji character, the address in the source address register 32 is placed onto the address bus 114. The address decoder 104 produces a low level Kanji ROM output enable signal, KOE/, on line 287 which clears the flip-flop 274 via an inverter 288. The low level output signal of flip-flop 274 places shift register 276 into a shift mode. Upon the end of each read signal, RD/, on line 290 produced by the DMAC 28, the binary value on the output of the shift register 276 shifts in response thereto. More specifically, this shifting is developed by a clock signal which is triggered by the rising edge of the read signal, RD/, through a NOR gate 292 which produces a falling edge causing a NOR gate 284 and buffer 286 to produce a rising edge onto the clock input of the shift register 276. Each time the shift register 176 is clocked, the enabling low level output is shifted to the next output enable signal. In this manner, upon each read signal, RD/, the device select sequencer sequentially enables the ROM's 18, 20, and 22. This occurs a total of 24 times to access the entire 24×24 font.

The scan position sequencer 170 provides the appropriate scan address signals, SA0, SA1, SA2, SA3 and SA4, on lines 294, 296, 298, 300 and 302 during Kanji memory access. When accessing the 16×16 font memory 16, these scan addresses will be incremented in a binary fashion 32 times in direct response to a read signal, RD/ on line 290 from the microprocessor 24. More specifically, the Kanji ROM output enable signal, KOE/, on line 287, will remain at a logic low level during an access to the Kanji ROMs. On the rising edge of the read signal, RD/, an OR gate 304 produces a rising edge signal which in turn is produced at the outputs of an AND gate 306, a NOR gate 308 and a buffer 310. The AND gate 306 will only produce this output when the font select signal, FSEL, on line 258 is set to a logic low level signifying that the 16×16 font has been selected. More specifically, upon the falling edge of the second JIS register enable signal, KB2/, on line 278, the inverter 280 will produce a clocking signal onto a flip-flop 311, clocking the low level font select signal, FSEL, onto its output. An inverter 313 will invert this low level producing an enabling high level to the AND gate 306. The rising edge signal produced at the output of the buffer 310 clocks the up-counter 312 causing the binary value on the up-counter 312's outputs to increment in a binary fashion. An up-counter 314 receives a clock signal via a buffer 316 and an inverter 318 from the carry output of the up-counter 312 so that together these counters operate as a five-bit binary up-counter. The counters 312 and 314 are reset via inverter 320 which responds to a high level output of flip-flop 274, the flip-flop 274 being set after the microprocessor 24 accesses the first JIS register 40. Thus, at the end of every read signal, RD/, on line 290 provided by the DMAC 28, the up-counters 312 and 314 increment. The outputs of the up-counters 312 and 314 provide the scan address signals, SA0, SA1, SA2, SA3 and SA4, on respective lines 294, 296, 298, 300 and 302 via a driver 321. Thus, in response to each read signal, RD/, 32 sequential scan addresses are provided to the ROM 16 for accessing the entire 32 bytes of the 16×16 font.

When accessing the 24×24 font memory, the clocking of the up-counter 312 follows a different pathway. Instead of clocking upon the end of every read signal, RD/, the up-counters 312 and 314 are responsive to the output of the shift register 276. More specifically, an AND gate 322 is enabled via the high level on the font select signal, FSEL, on line 258 which permits each low going signal from the ROM 1 output on line 265 of the shift register 276 to produce a rising edge upon the output of the AND gate 322 via an inverter 324. This rising edge propagates through the OR gate 308 and the buffer 310 to provide the clocking signal to the up-counter 312. The output of the shift register 276 which drives this clocking thus responds to every third read signal, RD/, from the DMAC 28 as described above. In this manner, the scan addresses, SA0, SA1, SA2, SA3 and SA4, only increment after three accesses have been made to the Kanji ROM's. More specifically, as described above, each scan address is held until the ROM's 18, 20 and 22 have been sequentially accessed.

Many modifications and variations of the present invention are possible in light of the above teachings. Thus it is to be understood that, within the scope of the appended claims, the invention may be practiced otherwise than as described herein above.

What is claimed and desired to be secured by Letters Patent is:

1. A printer for use with a symbol selection device, said printer printing symbols including selected symbols from a standardized set, each symbol in said set having associated coded information identifying said symbol within said set, said coded information being provided by said symbol selection device to select a symbol to be printed, said printer comprising:

means for storing coded information identifying a selected symbol to be printed;

symbol memory means for storing pixel data defining each symbol in said standardized set, each symbol having associated addresses for accessing the pixel data defining the symbol in said symbol memory means, said addresses including a starting address for said symbol;

reconfiguration circuitry for reconfiguring said coded information into said starting address for said selected symbol to be printed;

means for incrementing from said starting address to sequentially generate said addresses subsequent to said starting address for accessing the pixel data for said selected symbol from said symbol memory means;

image buffer means for storing pixel data for a plurality of selected symbols to be printed;

data accessing means for controlling the reading of pixel data from said symbol memory to said image buffer; and print head means for printing an image of said selected symbols defined by pixel data stored in said image buffer.

2. A printer as recited in claim 1 wherein said data access means includes a direct memory access controller.

3. A printer as recited in claim 1 wherein said symbol memory means includes a plurality of font memories, said printer further including device select logic for enabling one of said plurality of font memories to be responsive to said addresses generated by said reconfiguration circuitry and said address incrementing means.

4. A printer as recited in claim 3 wherein one of said font memories includes a plurality of memory devices, each of said memory devices storing a portion of the pixel data defining each symbol stored in said one font memory, said printer further including a device select sequencer means for controlling said device select logic to sequentially enable each of said memory devices, said device select sequencer means controlling the time at which said address incrementing means sequentially generates said addresses.

5. A printer as recited in claim 1 wherein said symbol memory means includes a plurality of font memories, said printer further including means for modifying the coded information provided by said symbol selection device to include information identifying one of said font memories, said modified coded information being stored in said coded information storage means.

6. A printer as recited in claim 5 including device select logic responsive to said font memory coded information stored in said coded information storage means to enable the identified font memory to be responsive to said addresses generated by said reconfiguration circuitry and said address incrementing means.

7. A printer as recited in claim 1 wherein said starting address for a symbol represents a symbol address and said addresses subsequent to said starting address represent scan addresses.

8. A printer for use with a symbol selection device, said printer printing symbols including selected symbols from a standardized set, each symbol in said set having associated coded information identifying said symbol within said set, said coded information being provided by said symbol selection device to select a symbol to be printed, said printer comprising:

a microprocessor control circuit for receiving coded information from said symbol selection device and generating a source address, a code word register address and a read control signal;

an address decoder responsive to said source address for generating a symbol memory enable and responsive to said code word register address for generating a code word register enable;

register means responsive to said code word register enable for storing coded information identifying a selected symbol to be printed;

symbol memory means for storing pixel data defining each symbol in said standardized set, said symbol memory means having symbol addresses associated with each symbol for accessing the pixel data defining the symbol;

image buffer means for storing pixel data for a plurality of selected symbols to be printed;

hardware means responsive to said coded information stored in said register means, to said symbol memory enable and to said read control signal for generating the symbol addresses for said selected symbol to cause said pixel data defining said selected symbol to be read from said symbol memory means to said image buffer; and a print head responsive to data stored in said image buffer for printing an image of said plurality of selected symbols.

9. A printer as recited in claim 8 wherein said microprocessor control circuit includes a microprocessor, and a direct memory access controller initialized by said microprocessor for controlling the reading of pixel data from said symbol memory means to said image buffer means.

10. A printer as recited in claim 9 wherein said direct memory access controller operates in a cycle steal mode to read said pixel data from said symbol memory means.

11. A printer as recited in claim 9 wherein said direct memory access controller operates in a no wait state mode.

12. A printer as recited in claim 9 wherein said microprocessor couples said code word register address to said address decoder and said direct memory access controller couples said source address to said address decoder.

13. A printer as recited in claim 8 wherein said symbol memory means includes a plurality of font memories, said hardware means including device select logic for enabling one of said plurality of font memories to be responsive to said generated symbol addresses.

14. A printer as recited in claim 13 wherein one of said font memories includes a plurality of memory devices, each of said memory devices storing a portion of the pixel data defining each symbol stored in said one font memory, said hardware means including a device select sequencer means for controlling said device select logic to sequentially enable each of said memory devices.

15. A printer as recited in claim 14 wherein each symbol stored in said symbol memory means includes a symbol address for selecting the symbol and a plurality of sequential addresses for accessing the pixel data defining the symbol, said hardware means including circuit logic to reconfigure said coded information into said symbol address; and an address position sequencer for sequentially incrementing from an initial sequential address through each of said plurality of sequential addresses to read the pixel data from said symbol memory to said image buffer means.

16. A printer as recited in claim 15 wherein said device select sequencer means controls the time at which said address position sequencer increments said sequential addresses for a symbol stored in said one font memory.

17. A printer as recited in claim 16 wherein said device select sequencer means controls said address position sequencer to increment said sequential address after pixel data is read from each of said memory devices for a given sequential address.

18. A printer as recited in claim 8 wherein said symbol memory means includes a plurality of font memories, said printer further including means for modifying the coded information provided by said symbol selection device to include information identifying one of said font memories said modified coded information being stored in said register means.

19. A printer as recited in claim 18 including device select logic responsive to said font memory coded information in said register means to enable said one font memory to be responsive to said generated symbol addresses.

20. A printer for use with a symbol selection device, said printer printing symbols including selected symbols from a standardized set of symbols, each symbol in said set having associated coded information identifying said symbol within said set, said coded information being provided by said symbol selection device to select a symbol to be printed, said printer comprising:

a microprocessor control circuit for receiving coded information from said symbol selection device and generating a source address, a code word register address and a read control signal;

an address decoder responsive to said source address for generating a symbol memory enable and responsive to said code word register address for generating a code word register enable;

register means responsive to said code word register enable for storing coded information identifying a selected symbol to be printed;

symbol memory means for storing pixel data defining each symbol in said standardized set, said symbol memory means including a plurality of memory devices, each of said memory devices storing a portion of the pixel data for each symbol and having symbol addresses associated with said pixel data for each symbol to allow the accessing of the pixel data defining the symbol in response to the symbols address and a memory device enabling signal;

image buffer means for storing pixel data for a plurality of selected symbols to be printed, said image buffer means having a destination address;

hardware means responsive to said coded information stored in said register means, to said symbol memory enable and to said read control signal for generating the symbol addresses for a selected symbol;

memory device selection logic responsive to said read control signal for sequentially generating for each symbol address a memory device enable signal for each of said memory devices to sequentially access pixel data portions from each of said memory devices to read said accessed pixel data to said image buffer;

a print head responsive to data stored in said image buffer for printing an image of said plurality of selected symbols.

21. A printer as recited in claim 20 wherein said microprocessor control circuit includes a microprocessor and a direct memory access controller initialized by said microprocessor for controlling the reading of pixel data from said symbol memory means to said image buffer means.

22. A printer as recited in claim 20 wherein said direct memory access controller operates in a cycle steal mode to read said pixel data from said symbol memory means.

23. A printer as recited in claim 20 wherein said direct memory access controller operates in a no wait state mode.

24. A printer as recited in claim 20 wherein said microprocessor couples said code word register address to said address decoder and said direct memory access controller couples said source address to said address decoder.

25. A printer as recited in claim 20 wherein each symbol stored in said symbol memory means includes a symbol address for selecting the symbol and a plurality of sequential addresses for accessing the pixel data defining the symbol, said hardware means including circuit logic to reconfigure said coded information into said symbol address; and an address position sequencer for sequentially incrementing from an initial sequential address through each of said plurality of sequential addresses to read the pixel data from said symbol memory to said image buffer means.

26. A printer as recited in claim 25 wherein said memory device selection logic controls the time at which said address position sequencer increments said sequential addresses for a symbol stored in said one font memory.

27. A printer as recited in claim 26 wherein said memory device selection logic controls said address position sequencer to increment said sequential address after pixel data is read from each of said memory devices for a given sequential address.

* * * * *